US008111066B2

(12) United States Patent
Lenglet

(10) Patent No.: US 8,111,066 B2
(45) Date of Patent: Feb. 7, 2012

(54) DEVICE AND METHOD FOR MEASURING THE MASS OF A MAGNETIC MATERIAL, AND ANALYSIS APPARATUS INCLUDING SUCH DEVICE

(75) Inventor: Luc Lenglet, Levallois Perret (FR)

(73) Assignee: Magnisense Technology Limited (CY)

( * ) Notice: Subject to any disclaimer, the term of this patent is extended or adjusted under 35 U.S.C. 154(b) by 326 days.

(21) Appl. No.: 12/532,672

(22) PCT Filed: Mar. 20, 2008

(86) PCT No.: PCT/FR2008/050486
§ 371 (c)(1),
(2), (4) Date: Sep. 23, 2009

(87) PCT Pub. No.: WO2008/132383
PCT Pub. Date: Nov. 6, 2008

(65) Prior Publication Data
US 2010/0052666 A1     Mar. 4, 2010

(30) Foreign Application Priority Data
Mar. 23, 2007   (FR) ...................................... 07 02134

(51) Int. Cl.
*G01R 33/00*     (2006.01)
(52) U.S. Cl. .......................... 324/228; 324/230; 324/232

(58) Field of Classification Search ........................ None
See application file for complete search history.

(56) References Cited

U.S. PATENT DOCUMENTS

| | | | |
|---|---|---|---|
| 7,432,715 B2 * | 10/2008 | Stamatescu | 324/345 |
| 7,543,509 B2 * | 6/2009 | Davies | 73/861.357 |
| 2008/0252289 A1 | 10/2008 | Lenglet | |

FOREIGN PATENT DOCUMENTS

| | | |
|---|---|---|
| EP | 1 262 766 A | 12/2002 |
| WO | WO 03/102546 A2 | 12/2003 |
| WO | WO 2005/010503 A1 | 2/2005 |
| WO | WO 2006/059258 A2 | 6/2006 |

\* cited by examiner

*Primary Examiner* — Jermele M Hollington
*Assistant Examiner* — Trung Nguyen
(74) *Attorney, Agent, or Firm* — Cantor Colburn LLP

(57) ABSTRACT

The invention relates to a device for measuring the mass of a magnetic material (6) present in an analysis medium, that comprises: a modulator (24) of the phase of a high-frequency and/or low-frequency component of a magnetic field for exciting the analysis medium with a modulation signal having a value that is modified by a frequency $f_{mod}$; and a demodulator (36) capable of demodulating the amplitude of an amplitude signal, measured in response to the excitation field, from the modulation signal, wherein said demodulator is connected to the output of a filter (34) and to the input of an estimation unit (44).

17 Claims, 3 Drawing Sheets

DEVICE AND METHOD FOR MEASURING THE MASS OF A MAGNETIC MATERIAL, AND ANALYSIS APPARATUS INCLUDING SUCH DEVICE

This application is a U.S. national phase application filed pursuant to 35 U.S.C. §371 claims benefit of PCT patent application No. PCT/FR2008/050486, filed Mar. 20, 2008, and French Patent Application No. 0702134, filed Mar. 23, 2007.

The present invention relates to a device and a method for measuring the mass of magnetic material, and to an analysis apparatus incorporating this device.

The European patent application published under the number EP 1 262 766 describes a device for measuring the mass of magnetic material present in an analysis medium comprising:
 a generator of an excitation magnetic field for exciting the magnetic material, this magnetic field comprising at least one low-frequency component and one high-frequency component, the low-frequency and high-frequency components corresponding to power peaks in the power spectrum of the excitation magnetic field respectively at frequencies $f_{LF}$ and $f_{HF}$, the frequency $f_{HF}$ being at least ten times greater than the frequency $f_{LF}$,
 sensor suitable for transforming the magnetic field induced in the magnetic material in response to the excitation magnetic field, into a measurement signal,
 a filter suitable for isolating the amplitude of a sinusoidal component of the measurement signal at a frequency $mf_{HF} \pm nf_{LF}$, where m and n are nonzero integers, this filter isolating a new value of the amplitude at each measurement period $T_m$, the temporal succession of the amplitudes isolated by this filter forming an amplitude signal, and
 an estimator of the mass of magnetic material present in the analysis medium on the basis of the amplitude signal and of a reference signal which is obtained on the basis of a gauge mass of the same magnetic material measured under the same conditions.

The above device operates particularly well. Nevertheless, the amplitude signal generated by the filter is marred by noise. Thus, the sensitivity of the device is limited by this noise.

The invention is aimed at proposing a measurement device which works according to the above principle but whose sensitivity is better or which is faster for equal sensitivity.

Its subject is therefore a device for measuring the mass of magnetic material present in an analysis medium in which:
 the generator comprises a modulator of the phase of the high-frequency and/or low-frequency component with a modulation signal whose value is modified with a frequency $f_{mod}$ less than or equal to $1/(T_m)$, and
 the device comprises a demodulator suitable for demodulating the amplitude of the amplitude signal on the basis of the modulation signal, this demodulator being linked up to the output of the filter and to the input of the estimator.

In the above device, modulation of the phase of the high-frequency and/or low-frequency component of the excitation magnetic field makes it possible to introduce a "signature" onto the signal that it is desired to measure, that is to say the amplitude signal. Here, signature is understood to mean a variation known in advance of the amplitude signal. The noise which is superimposed on the measured amplitude signal does not exhibit this signature. Thus, it becomes easier to identify the amplitude signal even in the presence of significant noise. This job of identifying the amplitude signal amid the noise is that of the demodulator. It is therefore appreciated that since the amplitude signal is easier to identify amid the noise, for equal sensitivity, the above device is faster since the amplitude signal can be filtered more rapidly. As a corollary, for equal filtering times, the above device exhibits better sensitivity than the known devices.

The embodiments of this device can comprise one or more of the following characteristics:
 the power spectrum of the modulation signal exhibits a power peak for the frequency $f_{mod}$ concentrating at least 80% of the total power of the modulation signal;
 the modulation signal is a sinusoid;
 m is equal to ±1, n is different from ±1, and the modulator is only able to modulate the phase of the low-frequency component;
 n is equal to ±1, m is different from ±1, and the modulator is only able to modulate the phase of the high-frequency component.

These embodiments of the device furthermore exhibit the following advantages:
 the use of a modulation signal more than 80% of whose power is concentrated around the frequency $f_{mod}$ amounts to using a signal close to a perfect sinusoid, thereby improving the immunity to noise,
 the use of a sinusoid in the guise of modulation signal represents a very good compromise between the simplicity and the improvement of the sensitivity of the device.

The subject of the invention is also an apparatus for analyzing a medium liable to contain one or more biological and/or chemical component(s) that one desires to detect and/or quantify, the medium to be analyzed including magnetic particles bound to the component or to a reagent making it possible to ensure the detection and/or the quantification of the component, this apparatus comprising:
 a receptacle suitable for containing the analysis medium, and
 a device for measuring the mass of the set of magnetic particles present in the analysis medium, the result of this measurement being proportional to the quantity of component to be analyzed present in the analysis medium.

The subject of the invention is also a method for measuring the mass of magnetic material in an analysis medium, this method comprising:
 the generation of an excitation magnetic field for exciting the magnetic material, this excitation magnetic field comprising at least one low-frequency component and one high-frequency component, the low-frequency and high-frequency components corresponding to power peaks in the power spectrum of the excitation magnetic field respectively at frequencies $f_{LF}$ and $f_{HF}$, the frequency $f_{HF}$ being at least ten times greater than the frequency $f_{LF}$,
 the transformation of the magnetic field induced in the magnetic material in response to the excitation magnetic field, into a measurement signal,
 the filtering of the measurement signal so as to isolate the amplitude of a sinusoidal component in this measurement signal at a frequency $mf_{HF}+nf_{LF}$, where m and n are nonzero integers, a new value of the amplitude being isolated at each measurement period $T_m$, the temporal succession of the isolated amplitudes forming an amplitude signal,
 the estimation of the mass of magnetic material present in the analysis medium on the basis of the amplitude signal and of a reference signal which are obtained on the basis of a gauge mass of the same magnetic material measured under the same conditions, the modulation of the phase of the high-frequency and/or low-frequency component with a modulation signal whose value is modified with a frequency $f_{mod}$ less than or equal to $1/(T_m)$, and the demodulation of the amplitude of the amplitude signal on the basis of the modulation signal, before carrying out the estimation of the mass of magnetic material present in the analysis medium on the basis of the demodulated amplitude signal.

The invention will be better understood on reading the description which follows given solely by way of nonlimiting example, while referring to the drawings in which:

FIG. 1 is a schematic illustration of an apparatus for analyzing biological or chemical components comprising a sensor of the mass of magnetic material present in an analysis medium, FIG. 2 is a flowchart of a method for analyzing a mixture of biological or chemical components with the aid of the apparatus of FIG. 1, and FIGS. 3 to 6 are graphs illustrating the evolution of various signals liable to be obtained at various points of the measurement device of the apparatus of FIG. 1.

In these figures, the same references are used to designate the same elements.

Subsequently in this description, characteristics and functions which are well known to the person skilled in the art are not described in detail.

FIG. 1 represents an apparatus 2 for analyzing a mixture of biological or chemical components present in an analysis medium 4.

The analysis medium contains magnetic particles bound to the component or to a reagent making it possible to ensure the detection or the quantification of the component. This reagent can be a reagent binding to the component. This reagent can be an analog of the component able to enter into competition with the component in a binding reaction with another element present.

In this example, it is assumed that the chemical or biological component to be analyzed is bound to magnetic particles. These magnetic particles exhibit a nonlinear magnetic cycle B(H) for an excitation magnetic field whose amplitude varies between $H_{min}$ and $H_{max}$. Here, the expression magnetic cycle designates the curve representing the evolution of the magnetic induction B in the magnetic particles as a function of the amplitude of the excitation magnetic field H.

In this example, the magnetic particles are beads 6 of superparamagnetic material. These beads exhibit a larger diameter of typically between 1 and 100 nanometres. The superparamagnetic materials used here are, for example, the same as those described in the patent application filed under the number FR 05 10 278. The magnetic cycle of these superparamagnetic materials furthermore exhibits strong nonlinearity for a zero excitation magnetic field. This strong nonlinearity results in the presence of an extremum for a zero magnetic field in the third derivative of the magnetic induction with respect to the magnetic field. This extremum is, in absolute value, the largest of the extrema that can be exhibited by the magnetic cycle of such a material.

The apparatus 2 comprises a receptacle 7 suitable for containing the analysis medium 4 and a device 5 for measuring the mass of the set of magnetic beads contained in the receptacle 7.

The expression analysis medium is understood to mean a delimited zone of the receptacle, which is read by the measurement device.

The device 5 comprises a generator of excitation magnetic fields and a sensor 10 of the magnetic induction in the beads 6.

The receptacle 7 is interposed between the generator 8 and the sensor 10.

By way of example, the receptacle can be a mini column filled with porous material(s) or a test strip comprising at least one porous material and optionally contained in a package. Such receptacles are commonplace in the fields of diagnostics and research into and measurement of contaminants (see for example EP 1 262 766).

The generator 8 is able to generate an excitation magnetic field comprising a low-frequency component and a high-frequency component. The low-frequency and high-frequency components correspond respectively to power peaks in the power spectrum of the excitation magnetic field, respectively at frequencies $f_{LF}$ and $f_{HF}$. The frequency $f_{HF}$ is greater than ten times the frequency $f_{LF}$. For example, the frequency $f_{HF}$ is equal to 100 kHz, while the frequency $f_{LF}$ is equal to 1 kHz.

Preferably, the low-frequency and high-frequency components alone represent at least 90% of the total energy of the excitation magnetic field. This improves the energy efficiency of the apparatus 2. More precisely, the energy of the excitation magnetic field is distributed between these two low-frequency and high-frequency components in such a way that each of them is clearly distinguished from the ambient noise. Moreover, the energy of the excitation magnetic field is chosen to be sufficiently large for the amplitude of the magnetic field produced to span the whole of the range lying between $H_{min}$ and $H_{max}$.

For this purpose, here, the generator 8 comprises a memory 12 in which two tables 14 and 16 are stored. The tables 14 and 16 each contain the set of values defining a sinusoid, respectively, at the frequencies $f_{HF}$ and $f_{LF}$.

The memory 12 is connected to an electronic card 18 suitable for generating, on the basis of the digital values recorded in the tables 14 and 16, an electrical signal exhibiting a low-frequency component and a high-frequency component, respectively at the frequencies $f_{LF}$ and $f_{HF}$. For this purpose, the card 18 comprises a digital analog conversion, filtering and amplification block 20 suitable for generating the analog electrical signal on the basis of the digital values contained in the tables 14 and 16. The block 20 is linked up to each of the ends of a coil 22 suitable for transforming the electrical signal into a corresponding excitation magnetic field.

The card 18 also comprises a phase modulator 24. This modulator 24 is linked up to a clock 26. The modulator 24 is suitable for modulating the phase of the low-frequency component with a modulation signal. The frequency at which the value of the modulation signal is modified is determined by the frequency $f_{mod}$ of the clock 26. This frequency $f_{mod}$ is less than or equal to $1/(T_m)$, where $T_m$ is a measurement period which will be defined further on in this description.

In this example, the modulation signal is a periodic signal in the form of gating pulses of period $T_{mod}$ greater than or equal to $2T_m$. Over a period $T_{mod}$, this modulation signal takes the value "+1" for 50% of the time, and the value "−1" for the remainder of the time. At each rising and falling edge of the modulation signal, the phase of the low-frequency component is shifted by $\pi$ rad.

Here, the introduction of a shift of π radians of the phase of the low-frequency component is achieved through a jump in the values of the table 16.

The sensor 10 is, for example, formed of a coil 30 placed with respect to the receptacle so as to be sensitive to the magnetic field produced by the magnetic induction in the beads 6. This coil 30 is linked up to an analog digital converter 32 generating as output a measurement signal S(T) proportional to the magnetic induction in the beads 6.

The apparatus 2 next comprises a filter 34 suitable for isolating in the signal S(T) the amplitude of a component of frequency $f_m$, where the frequency $f_m$ is defined by the following relation:

$$f_m = mf_{HF} \pm nf_{LF}$$

where m and n are nonzero integers.

For example, the filter 34 is a synchronous demodulator. This synchronous demodulator is synchronized in phase with the excitation magnetic field by way of a connection 35. The synchronous demodulation presupposes the availability of a certain number of points of the signal S(T). Consequently, the filter 34 isolates an amplitude $A(T)_p$ of the frequency component $f_m$ just once per measurement period $T_m$. Typically, the period $T_m$ is less than 10 milliseconds and preferably less than 1 millisecond. The temporal succession of the amplitudes $A(T)_p$ forms an amplitude signal A(T).

The signal A(T) is received by a demodulator 36.

The demodulator 36 comprises a multiplier 40 suitable for multiplying the signal A(T) by the same modulation signal as that used by the modulator 24. For this purpose, the modulation signal used by the modulator 24 and by the multiplier 40 are synchronized, in phase, with one another by the clock 26. Here, the clock 26 is linked up to the multiplier 40 by way of a connection 38.

The demodulator 36 also comprises a filter 42 suitable for isolating an amplitude $A_m$ on the basis of the result from the multiplier 40. For example, the filter 42 comprises an accumulator suitable for accumulating a results of multiplications carried out by the multiplier 40, followed by a divider suitable for dividing the result of the accumulation by this same number a so as to obtain the amplitude $A_m$.

Finally, the apparatus 2 comprises an estimator 44 which, on the basis of the amplitude $A_m$ and of a reference signal $A_{ref}$ recorded in a memory 46, is able to generate an estimation $\hat{M}_m$ of the mass of the set of beads 6 present in the medium 4.

The operation of the apparatus 2 will now be described in greater detail and with regard to the analysis method of FIG. 2.

The method is applied to the detection and/or quantification of a biological and/or chemical component (analyte) liable to be present in a medium. The analysis medium is then a sample or a fraction of a sample of the medium to be tested which has been placed in the presence of the magnetic particles or of a reagent or an analog bound to these particles. According to a preferred modality, the mass of magnetic material which has concentrated with a fraction of the analysis medium in a delimited zone of the receptacle, commonly called the reaction or detection zone in the fields of diagnostics or research in contaminants, is estimated. The receptacle can be as defined above. The concentration of the magnetic material in the delimited zone can be achieved by immobilizing the analyte and/or optional binding partners or reagents, in the presence of magnetic beads bound specifically to one of these elements, on a ligand, especially a ligand immobilized on a solid support in the detection zone. As is known per se in the field of diagnostics especially, the reaction can be of the sandwich, blocking or competition type.

By way of example, in a test of sandwich type, intended to detect and quantify an antigen, the analyte is the antigen, the reagent is a marked antibody, that is to say one which is bound to the magnetic particles, the ligand is a specific antibody of the antigen. The apparatus detects the signal emitted by the reagent bound to the analyte, itself bound to the ligand.

Initially, during a step 60, the apparatus 2 is calibrated. This step 60 consists in producing and recording the reference signal $A_{ref}$ in the memory 46. For this purpose, a medium 4 containing a known gauge mass $M_{ref}$ of beads 6 is placed in the receptacle 7. Next, the mass $M_{ref}$ and the result $A_{ref}$ of the measurement of this gauge mass with the aid of the apparatus 2 are recorded in the memory 46. During step 60, the measurement is carried out in the same manner as that described below.

Next, a medium 4 containing an unknown mass $M_m$ of beads 6 is placed in the receptacle 7. The apparatus 2 then proceeds to a phase 62 of generating the excitation magnetic field.

During this phase 62, during a step 64, the card 18 generates a low-frequency digital sinusoid on the basis of the values contained in the table 16.

Next, during a step 66, the phase of this low-frequency digital sinusoid is modulated with the modulation signal by the modulator 24. For example, at each tick of the clock 26, the modulator automatically jumps one or more values of the table so as to advance the phase of the low-frequency component generated. Here, the modulator 24 advances the phase of the low-frequency sinusoid by π rad at each tick of the clock 26, where 2π rad represents a period of the low-frequency component.

In parallel, during a step 68, the card 18 generates a high-frequency sinusoid on the basis of the values recorded in the table 14. The phase of this high-frequency sinusoid is not modulated.

Next, during a step 70, the phase-modulated low-frequency digital sinusoid and the high-frequency digital sinusoid are added together.

During a step 72, the block 20 transforms the result of the addition carried out during step 70 into an analog electrical signal. This electrical signal is then transmitted to the coil 22 which transforms it into an excitation magnetic field. The excitation magnetic field therefore exhibits a high-frequency component whose phase is not modulated and a low-frequency component whose phase is modulated by the modulation signal.

During a step 74, the excitation magnetic field excites the beads 6 present in the medium 4, thereby producing a magnetic induction B in these beads. In response the magnetic induction generates a response magnetic field.

During a step 76, the sensor 10 transforms the response magnetic field into a digital measurement signal S(T). Because of the nonlinearity of the magnetic cycle B(H), the signal S(T) exhibits components at frequencies $mf_{HF} + nf_{LF}$. The amplitude of these components at multiples of the frequencies $f_{HF}$ and $f_{LF}$ is representative of the mass of the beads 6 present in the medium 4. In the example described here, only the amplitude of the component of frequency $f_m = f_{HF} + 2f_{LF}$ is of interest.

During a step 78, the measured signal S(T) is filtered by the filter 34 so as to isolate the amplitude of the component $f_m$. During this step 78, given that the filter is a synchronous demodulator, the following operations are carried out:

The signal S(T) is multiplied point by point with a sinusoid of frequency $f_m$, the sinusoid of frequency $f_m$ being synchronized with the signal S(T) by way of the connection 35. The synchronization consists in maintaining the sinusoid of frequency $f_m$ in phase with the signal S(T).

The accumulation of P successive results of the multiplication.

The division of the result of the accumulation by the number P so as to obtain a value $A(T)_p$ of the signal A(T).

The trend in the evolution of the signal A(T) over time is illustrated in FIG. 3 in the particular case where the low-frequency component is not phase-modulated. In FIG. 3, the abscissa axis represents the time in milliseconds, while the ordinate axis represents the amplitude of the signal A(T). As may be seen in this FIG. 3, the signal A(T) is very noisy.

The curve 81 of FIG. 4 represents the evolution of the signal A(T) over time when the low-frequency component is phase-modulated and in the particular case where the noise in the measurement is the same as that used to obtain the graph of FIG. 3.

Next, during a step 80, the signal A(T) is demodulated by the demodulator 36. During step 80, the multiplier 40 multiplies point-by-point the signal A(T) by the modulation signal. The modulation signal is synchronized with the signal A(T) by way of the connection 38. This synchronization consists in maintaining the modulation signal and the signal A(T) in phase.

In FIG. 4, the modulation signal is a rectangular signal represented by curve 82.

Next, still during step 80, the result of the multiplication is transmitted to the filter 42 which filters the multiplied signal. For example, the multiplied signal is filtered with the aid of a simple sliding mean over a successive values. a is chosen to be greater than 100 and preferably greater than 1000.

Figure 1:
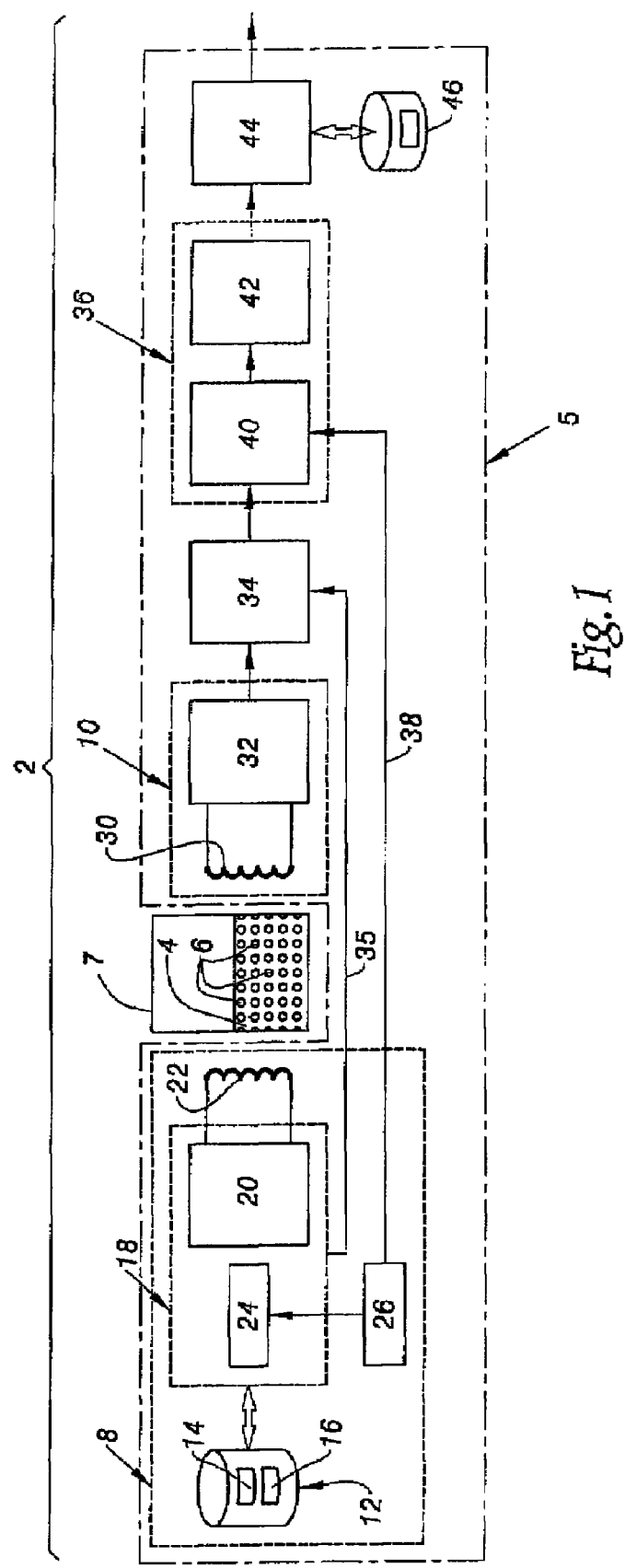
Figure 2:
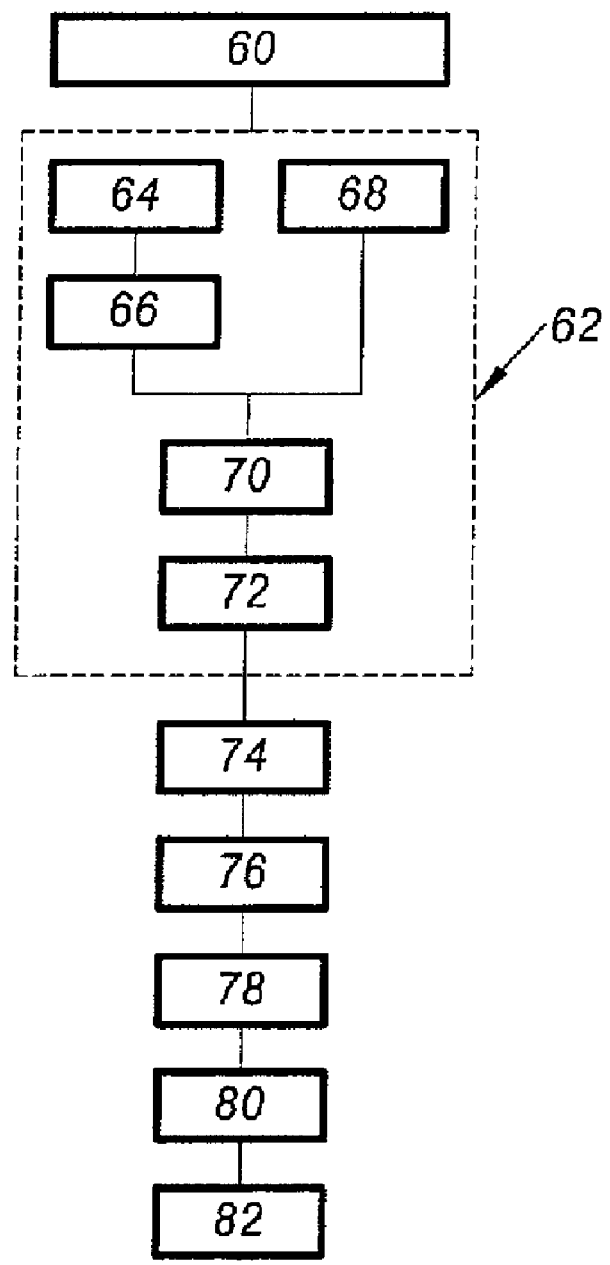
Figure 3:
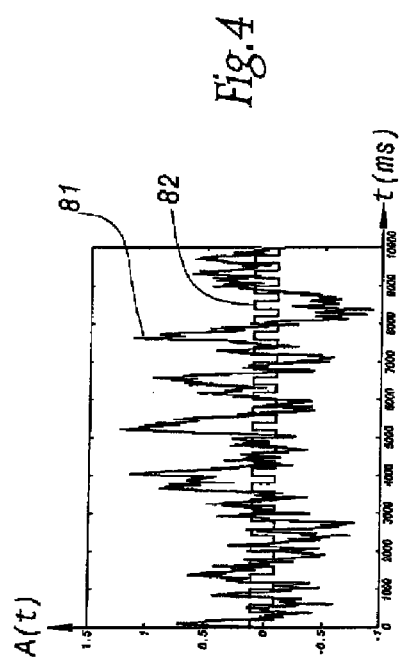
Figure 4:
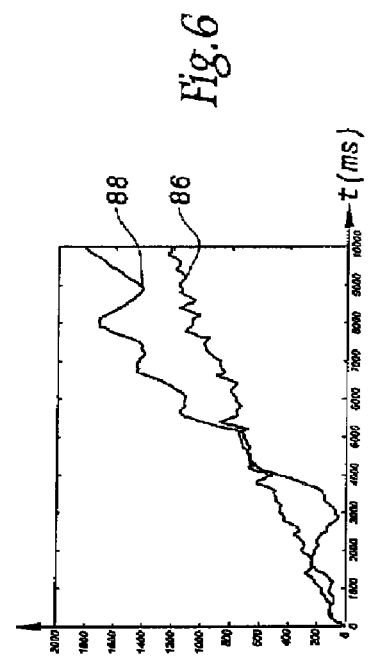
FIG. 4 represents the evolution over time of the modulation signal superimposed on the evolution over time of the signal A(T).
Figure 5:
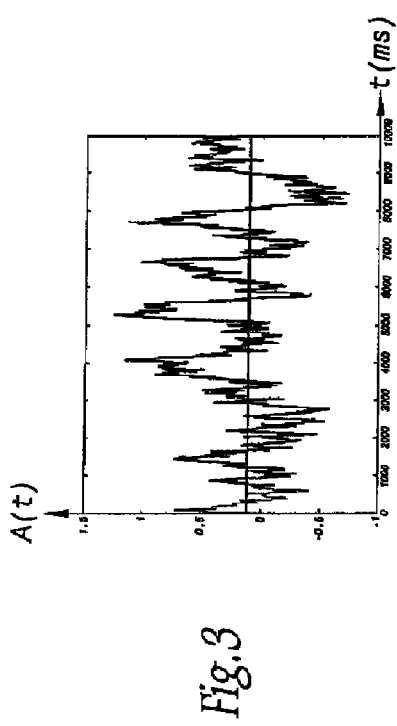
FIG. 5 represents the result of the multiplication of each point of the signal A(T) by the point corresponding to the same instant of the modulation signal, that is to say the result of the multiplication of curve 81 by curve 82.
Figure 6:
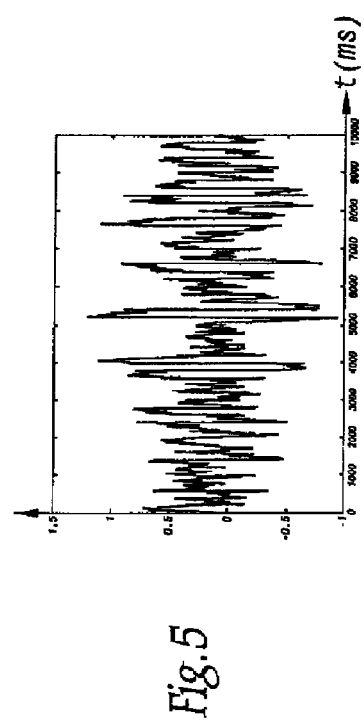

FIG. 6 represents by a curve 86 the accumulation over time of the multiplied signal, that is to say of the curve of FIG. 5. In this same graph, a curve 88 represents the accumulation over time of the signal A(T) obtained without implementing the modulation of phases of the low-frequency component, that is to say of the curve of FIG. 3. Comparison of curves 86 and 88 reveals that the elimination of the noise is much more effective when the modulator 24 and the demodulator 40 are employed than when the apparatus 2 is devoid of such modulator and demodulator.

Finally, during a step 82, the amplitude $A_m$ obtained at the output of the demodulator 36 is transmitted to the estimator 44. The estimator 44 then estimates the mass $\hat{M}_m$ Of beads 6 present in the medium 4 analyzed on the basis of this amplitude $A_m$ and, for example, of the mass $M_{ref}$ and of the amplitude $A_{ref}$ recorded in the memory 46. For example, a simple rule of three makes it possible to obtain the estimation $\hat{M}_m$.

Numerous other embodiments are possible. For example, the filter 34 can be embodied with the aid of means other than a synchronous demodulator. Other examples of filtering are described in patent application EP 1 262 766.

Other types of magnetic field sensors than those comprising a coil 30 can be used. For example a Hall-effect or other sensor can be used instead of the sensor 10.

The apparatus 2 has been described here in the particular case where m equals 1 and n equals two.

Nevertheless, what has been described here applies to other frequency components. In particular, the following rule will be applied:

if m is equal to ±1 and n is different from ±1, then only the phase of the low-frequency component is modulated, if n is equal to ±1 and m is different from ±1, then only the phase of the high-frequency component is modulated, and if the absolute values of m and n are both strictly greater than 1, then it is possible to modulate the phase, either of the high-frequency component alone, or of the low-frequency component alone, by choice.

It will be noted that whatever the embodiment, at least one of the two components does not have to be phase-modulated.

The device 5 has been described in the particular case where the modulation signal is a periodic signal of square form. As a variant, this modulation signal can be replaced with another modulation signal whose waveform is as close as possible to a perfect sinusoid.

What has been described here also applies to the case where the modulation signal is not periodic. For example, the periodic modulation signal can be replaced with a pseudo-random sequence. From the moment the pseudo-random sequence is known in advance, the latter makes it possible to sign the signal A(T), which, all things considered, makes it possible to more easily isolate the signal to be measured from the noise.

The invention claimed is:

1. A device for measuring the mass of magnetic material present in an analysis medium, the device comprising:
   a generator of an excitation magnetic field for exciting the magnetic material, the magnetic field comprising at least one low-frequency component and one high-frequency component, the low-frequency and high-frequency components corresponding to power peaks in the power spectrum of the excitation magnetic field respectively at frequencies $f_{LF}$ and $f_{HF}$, the frequency $f_{HF}$ being strictly greater than the frequency $f_{LF}$,
   a sensor suitable for transforming the magnetic field induced in the magnetic material in response to the excitation magnetic field into a measurement signal,
   a filter suitable for isolating the amplitude of a sinusoidal component of the measurement signal at a frequency $mf_{HF} \pm nf_{LF}$, where m and n are nonzero integers, the filter isolating a new value of the amplitude at each measurement period $T_m$, the temporal succession of the amplitudes isolated by the filter forming an amplitude signal, and
   an estimator of the mass of magnetic material present in the analysis medium on the basis of the amplitude signal and of a reference signal which is obtained on the basis of a gauge mass of the same magnetic material measured under the same conditions, characterized in that:
   the generator comprises a modulator of the phase of the high-frequency and/or low-frequency component with a modulation signal whose value is modified with a frequency $f_{mod}$ less than or equal to $1/(T_m)$, and
   the device comprises a demodulator suitable for demodulating the amplitude of the amplitude signal on the basis of the modulation signal, the demodulator being linked up to the output of the filter and to the input of the estimator.

2. The device as claimed in claim 1, in which the power spectrum of the modulation signal exhibits a power peak for the frequency $f_{mod}$ concentrating at least 80% of the total power of the modulation signal.

3. The device as claimed in claim 2, in which the modulation signal is a sinusoid.

4. The device as claimed in claim 1, in which m is equal to ±1, n is different from ±1, and the modulator is only able to modulate the phase of the low-frequency component.

5. The device as claimed in claim 1, in which n is equal to ±1, m is different from ±1, and the modulator is only able to modulate the phase of the high-frequency component.

6. The device as claimed in claim 1, wherein the frequency $f_{HF}$ is at least ten times greater than the frequency $f_{LF}$.

7. An apparatus for analyzing an analysis medium liable to contain a biological and/or chemical component, the medium to be analyzed including magnetic particles bound to the component or to a reagent making it possible to ensure the detection and/or the quantification of the component, the apparatus comprising:
   a receptacle suitable for containing the analysis medium, and
   a device for measuring the mass of the set of magnetic particles present in the analysis medium, the result of this measurement being proportional to the quantity of component to be analyzed present in the analysis medium, the device comprising:
   a generator of an excitation magnetic field for exciting the magnetic material, the magnetic field comprising at least one low-frequency component and one high-frequency component, the low-frequency and high-frequency components corresponding to power peaks in the power spectrum of the excitation magnetic field respectively at frequencies $f_{LF}$ and $f_{HF}$, the frequency $f_{HF}$ being strictly greater than the frequency $f_{LF}$,
   a sensor suitable for transforming the magnetic field induced in the magnetic material in response to the excitation magnetic field into a measurement signal,
   a filter suitable for isolating the amplitude of a sinusoidal component of the measurement signal at a frequency $mf_{HF} \pm nf_{LF}$, where m and n are nonzero integers, the filter isolating a new value of the amplitude at each measurement period $T_m$, the temporal succession of the amplitudes isolated by the filter forming an amplitude signal, and
   an estimator of the mass of magnetic material present in the analysis medium on the basis of the amplitude signal and of a reference signal which is obtained on the basis of a gauge mass of the same magnetic material measured under the same conditions, characterized in that:
   the generator comprises a modulator of the phase of the high-frequency and/or low-frequency component with a modulation signal whose value is modified with a frequency $f_{mod}$ less than or equal to $1/(T_m)$, and
   the device comprises a demodulator suitable for demodulating the amplitude of the amplitude signal on the basis of the modulation signal, the demodulator being linked up to the output of the filter and to the input of the estimator.

8. The device as claimed in claim 7, in which the power spectrum of the modulation signal exhibits a power peak for the frequency $f_{mod}$ concentrating at least 80% of the total power of the modulation signal.

9. The device as claimed in claim 8, in which the modulation signal is a sinusoid.

10. The device as claimed in claim 7, in which m is equal to ±1, n is different from ±1, and the modulator is only able to modulate the phase of the low-frequency component.

11. The device as claimed in claim 7, in which n is equal to ±1, m is different from ±1, and the modulator is only able to modulate the phase of the high-frequency component.

12. The device as claimed in claim 7, wherein the frequency $f_{HF}$ is at least ten times greater than the frequency $f_{LF}$.

13. A method for measuring the mass of magnetic material present in an analysis medium, the method comprising:
   the generation of an excitation magnetic field comprising at least one low-frequency component and one high-frequency component, the low-frequency and high-frequency components corresponding to power peaks in the power spectrum of the excitation magnetic field respectively at frequencies $f_{LF}$ and $f_{HF}$, the frequency $f_{HF}$ being at least ten times greater than the frequency $f_{LF}$,
   the transformation of the magnetic field induced in the magnetic material in response to the excitation magnetic field into a measurement signal,
   the filtering of the measurement signal so as to isolate the amplitude of a sinusoidal component in the measurement signal at a frequency $mf_{HF} \pm nf_{LF}$, where m and n are nonzero integers, a new value of the amplitude being isolated at each measurement period $T_m$, the temporal succession of the isolated amplitudes forming an amplitude signal, and
   the estimation of the mass of magnetic material present in the analysis medium on the basis of the amplitude signal and of a reference signal which is obtained on the basis of a gauge mass of the same magnetic material measured under the same conditions, characterized in that the method comprises:
   the modulation of the phase of the high-frequency and/or low-frequency component with a modulation signal whose value is modified with a frequency $f_{mod}$ less than or equal to $1/(T_m)$, and
   the demodulation of the amplitude of the amplitude signal on the basis of the modulation signal, before carrying out the estimation of the mass of magnetic material present in the analysis medium on the basis of the demodulated amplitude signal.

14. The method as claimed in claim 13, in which the power spectrum of the modulation signal exhibits a power peak for the frequency $f_{mod}$ concentrating at least 80% of the total power of the modulation signal.

15. The method as claimed in claim 14, in which the modulation signal is a sinusoid.

16. The method as claimed in claim 13, in which m is equal to ±1, n is different from ±1, and the modulator is only able to modulate the phase of the low-frequency component.

17. The method as claimed in claim 13, in which n is equal to ±1, m is different from ±1, and the modulator is only able to modulate the phase of the high-frequency component.

* * * * *